United States Patent Office 3,209,117
Patented Sept. 28, 1965

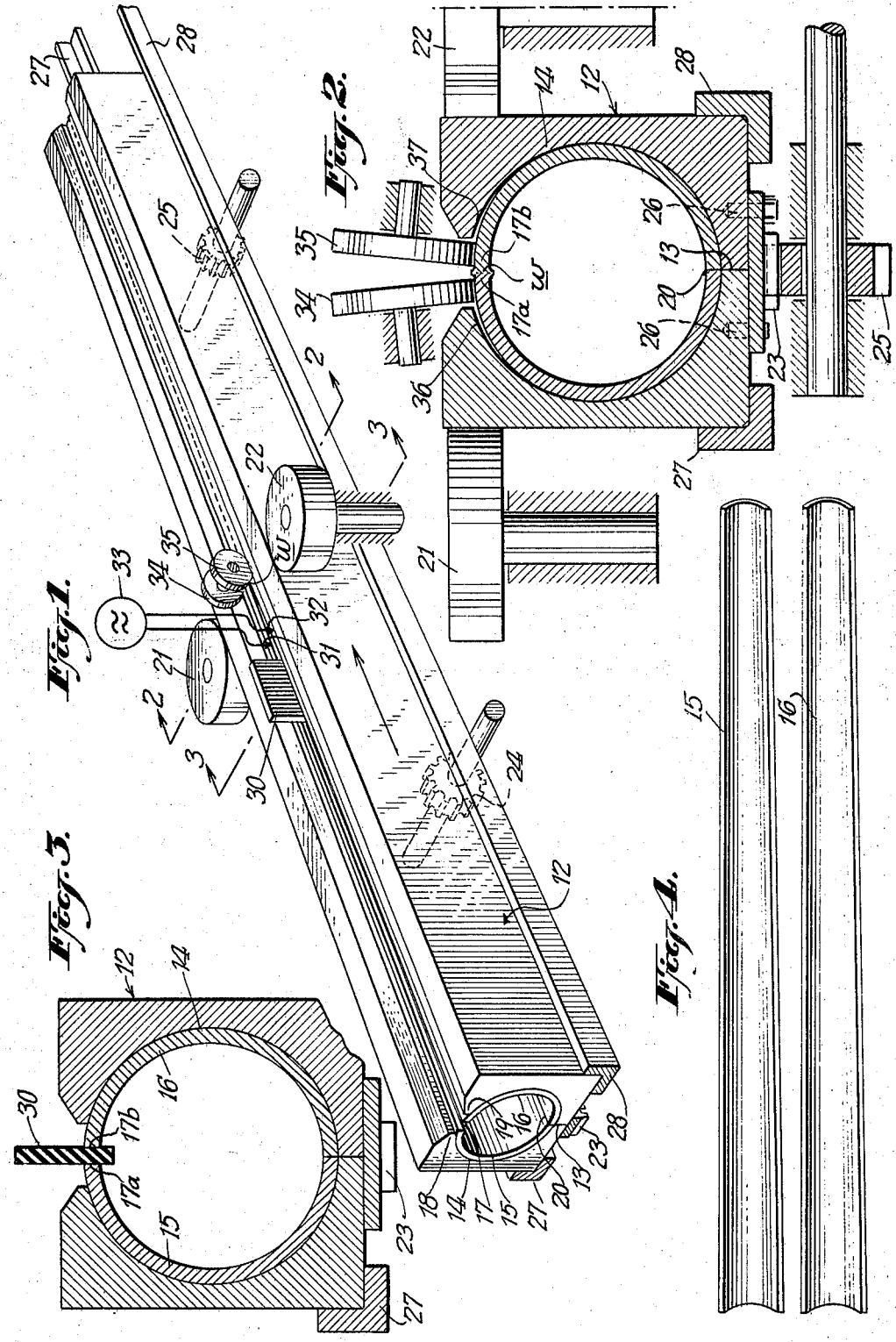

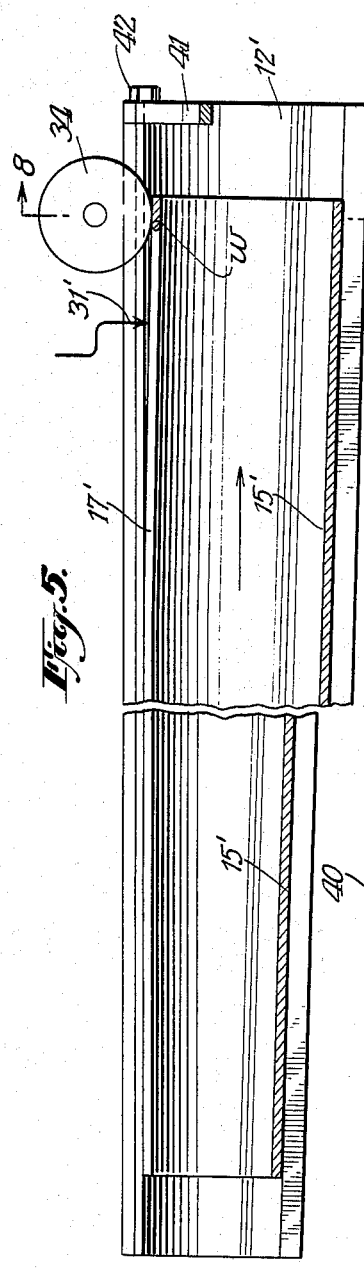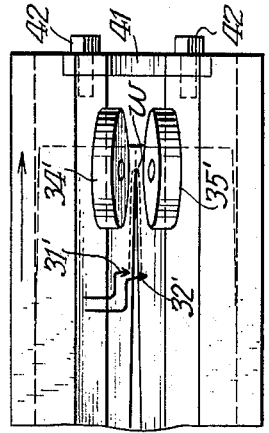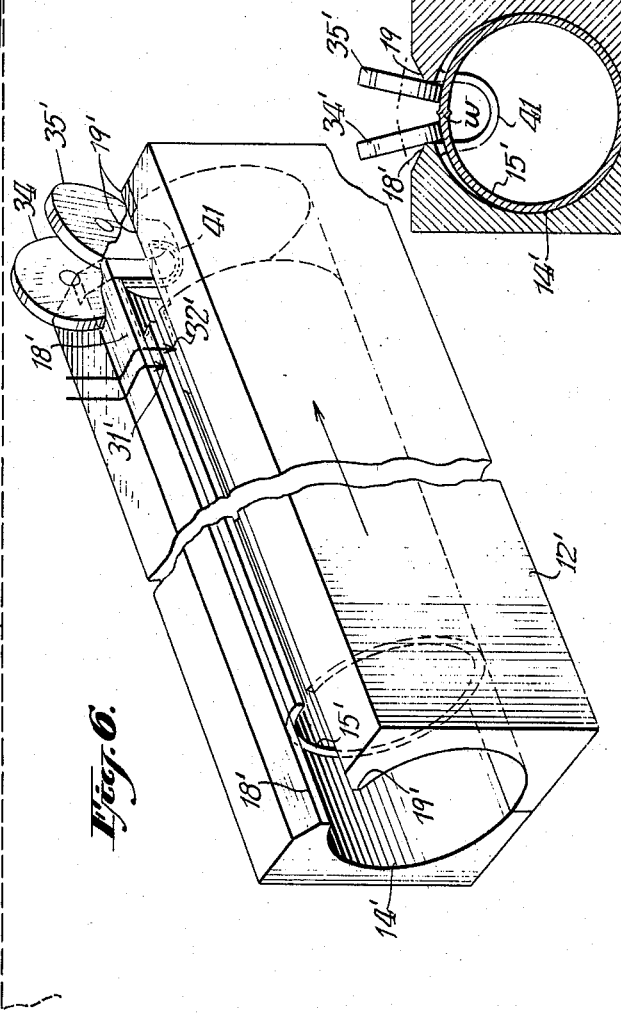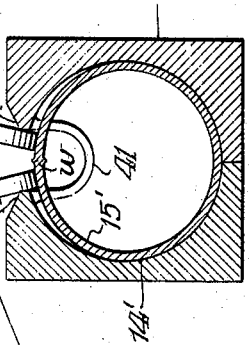

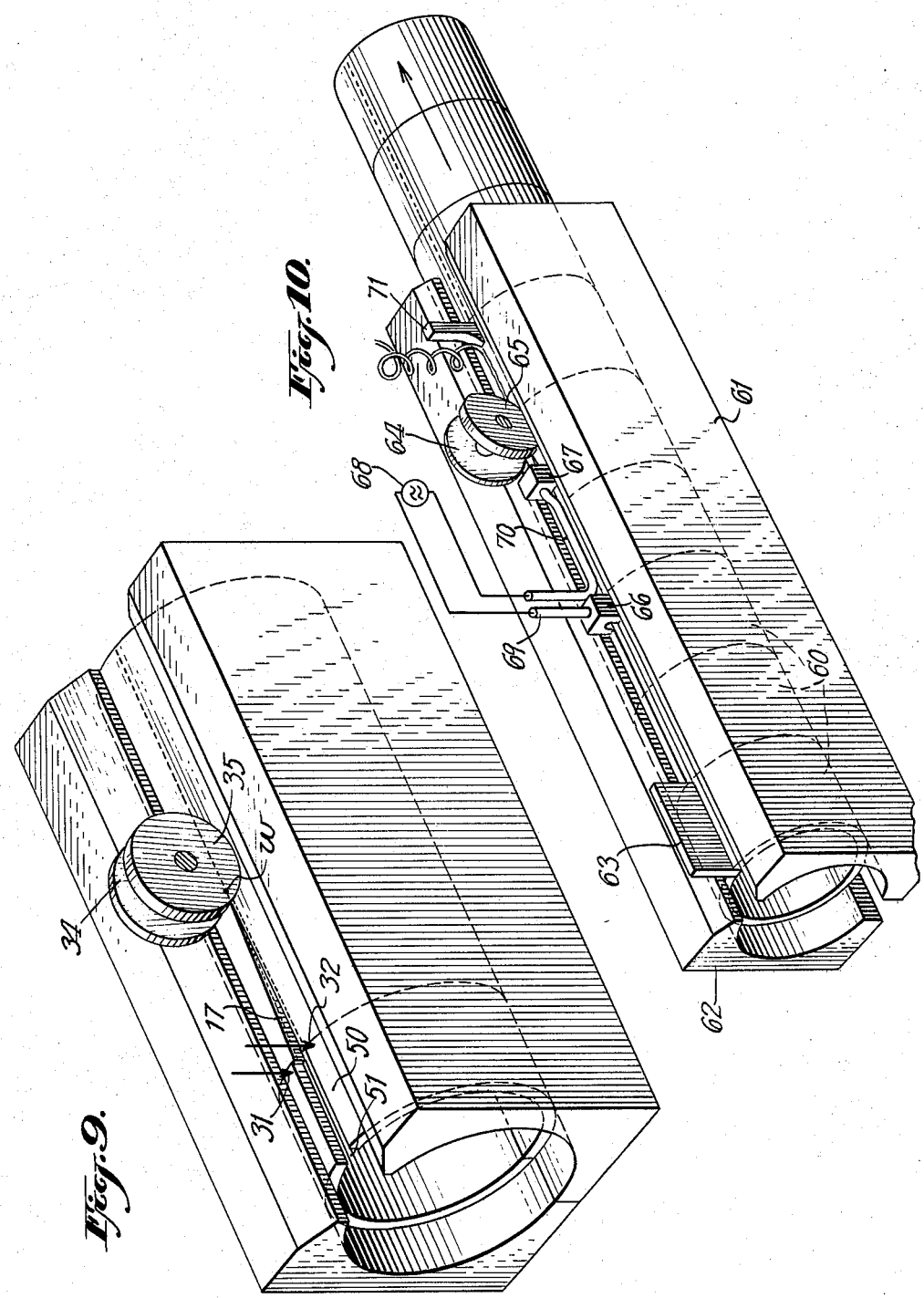

3,209,117
WELDING OF TUBULAR MEMBERS
Jack Morris, Monsey, and Wallace C. Rudd, Larchmont, N.Y., assignors to American Machine & Foundry Company, New York, N.Y., a corporation of New Jersey
Filed Apr. 18, 1963, Ser. No. 274,040
10 Claims. (Cl. 219—59)

This invention relates to the welding of seams along the walls of tubular members by the use of high frequency electrical heating current.

A method and apparatus for welding together the edges of a longitudinal gap in metal tubing by the use of high frequency electrical heating current, has come into extensive and successful use and which involves applying the high frequency current by contacts to the opposite sides of the gap so that the current flows from such contacts to and from a weld point located subsequent to the contacts and where the gap edges are forced together in a forged welded relation by the use of so-called squeeze rollers located at opposite sides of the tubing and between which the tubing is rapidly advanced.

Such apparatus, however, in the forms heretofore available, has not been adapted for the welding of longitudinal gaps in tapered tubing, that is, tubing in which the diameter or cross-sectional dimensions vary along the length of the member, and also in some cases such apparatus is not well adapted, or becomes unduly cumbersome, when an attempt is made to so construct and arrange same with proper dimensions for relatively large-diameter tubing, and particularly if the tube members are not of limited lengths or have some special non-circular cross-sectional shapes. As an example of such instances, tubular members such as sometimes used as lamp posts or poles may be mentioned. These are generally of quite large cross-sectional dimensions, are often tapered, and may be formed of various polygonal cross-sectional shapes.

The present invention makes possible reliable means and methods for efficiently welding members of this nature.

In accordance with the invention, the tubular member or members having a longitudinal gap, are first deposited within an elongated, generally box-like die means formed with a cavity for generally closely receiving and fitting the tubular members, such cavity having a longitudinal opening, the tubular members being so placed that the longitudinal gaps therein to be welded will extend along the midportion of the longitudinal opening of such cavity. Then the box-like member, together with the tubular member or members therein, are advanced past a weld point and, along in advance of such point, the gap edges of the tubular member or members are heated by application thereto of high frequency current. And at the region of the weld point, a pair of rollers located respectively at opposite sides of the desired welded seam press against the gap edge portions to be welded respectively, forcing such edge portions inwardly of the box-like die means, so that thereby such portions are forced toward the axis of the tubular member and thus are brought into forged, welded relation at the weld point, preferably a butt weld being formed. The interior cavity of the box-like die means may be shaped to receive either tapered or straight-sided tubular members, or members which may be either circular or of other desired cross-sectional shapes.

The box-like die means may be advanced by any suitable mechanical means and same also may, if desired, be formed of two longitudinally separable half portions so that same may be opened readily to receive the tubular members of whatever cross-sectional shape appropriate for the shape of the cavity in the die means, and, after the welding operation, the die means may be readily opened up by separating its halves to release the welded members. In some cases it may be desired to form the welded members with two longitudinal seams along opposite sides thereof and, in such instances, the two longitudinal portions to be welded may first be inserted in a position in the die means for welding one of the seams and then the die means may be opened and the member turned so as to permit welding of the other seam by reusing the same die means.

Also, in some cases it may be desired rapidly to weld longitudinal gaps in a succession of tubular members of relatively short lengths. In such cases, it may be preferable to provide suitable mechanical means for pushing such succession of members longitudinally through the die means, while the members are being welded, in lieu of advancing the die means along with the tubular member or members.

Further aspects of the present invention concern methods and means for solving the problem of welding the desired seams starting at the very forward ends of the tubular members and continuing to the very trailing ends thereof and with the high frequency current so applied that, by the time the forward ends reach the weld point, same will have become heated to welding temperature and so that at the trailing ends, the gap edges will continue to be appropriately heated until the ends reach the weld point, without previously short-circuiting the heating currents along on the gap edges.

Various further and more specific objects, features and advantages of the invention will appear from the description given below, taken in connection with the accompanying drawings, illustrating by way of example preferred forms of the invention.

In the drawings:

FIG. 1 is a somewhat schematic perspective view of one embodiment of the apparatus of the invention, and illustrative of the method of the invention;

FIGS. 2 and 3 respectively are vertical sectional views taken substantially along lines 2—2 and 3—3 of FIG. 1;

FIG. 4 comprises views of two separated halves of a longitudinally tapered tubular member such as may be welded by the use of the invention.

FIG. 5 is a longitudinal vertical sectional view schematically illustrating portions of an embodiment of the invention and with a tubular member here shown in longitudinal section and in position to be welded;

FIG. 6 is a somewhat schematic perspective view of an embodiment of the invention such as of FIG. 5 and illustrating one way in which the forward end edges at the gap to be welded may be heated to insure the starting of the welded seam at the very forward end thereof;

FIG. 7 is a plan view, partially broken away, of the forward end portions of the arrangement of FIG. 6 and showing the parts in positions where welding of the seam has just begun;

FIG. 8 is a view taken substantially along line 8—8 of FIG. 5 as well as of FIG. 7;

FIG. 9 is a perspective view partially broken away of an embodiment of the invention which may be similar to that of FIG. 6 but illustrating an arrangement providing for welding the trailing end of the seams, and;

FIG. 10 is a schematic perspective view of an alternative embodiment of the invention, wherein a succession of tubular elements may be welded and with the high frequency current applied by electrodes, one succeeding the other in so-called "in-line" relation.

Referring to the drawings in further detail, an elongated box-like die means is indicated at 12, which is preferably separable into two halves along a longitudinal parting line as indicated at 13. This means is formed with a longitudinally-extending cavity therein of a size and shape adapted substantially to fit around the tubular member or members which are to be welded. In the particular example shown, the cavity 14 is of circular cross-section and tapered along its length in a manner such as to receive a tapered tubular member in the form shown in FIG. 4, in which figure the tubular member is shown as divided longitudinally into two halves 15 and 16.

As will be apparent in FIG. 1, the tubular member 15, 16, is placed in the die member in a position whereby a longitudinal gap 17, the edges of which are to be welded together, extends along midway between the edges 18 and 19 of a longitudinal opening in the die means, whereas, as shown, the opposite seam line of the tubular member 15, 16 will be located as at 20 along the bottom of the cavity 14.

The die means with the tubular member therein as shown, is adapted to be longitudinally advanced in the direction indicated by the arrow thereon, past and between suitable means for insuring that the side walls of the die member will be kept from spreading apart. For example, this means may take the form of rollers as at 21, 22, mounted on suitable bearings and in positions to have rolling engagement with the side wall surfaces of the die means as the latter passes therebetween. The die means may be advanced by suitable mechanical means, one example of which may constitute a rack member as at 23, extending longitudinally along throughout the length of the bottom thereof and adapted to be engaged by suitable driven pinion means as at 24, 25. As indicated in FIG. 2, the rack may be detachably secured in place as by pins or screws as indicated at 26, located at various points along the rack and engaging in the bottom surfaces of the sections of the die means.

Suitable channel members as at 27, 28 may be provided for guiding and supporting the lower corners respectively of the die means as same slides thereon.

At a point somewhat in advance of the rollers 21, 22, a seam guide, as at 30, may be mounted on suitable supporting means (not shown). This may be formed of insulation material or with insulation surfaces and is positioned to extend down into the gap 17, to assure that such gap will be in the proper position and of a proper width shortly in advance of the region where the welding occurs.

The winding may take place at a weld point *w* shortly in advance of this point a pair of contacts as at 31, 32 engage the metal at opposite sides of the gap 17. These contacts are connected to a suitable source of high frequency current, as indicated at 33, such current having a frequency of at least about 50,000 cycles per second, although usually higher frequencies up to 300,000 or 400,000 cycles per second may be preferred.

A pair of pressure rollers as at 34, 35 are suitably mounted on bearings to engage the edge portions 17*a* and 17*b* respectively of the gap in the tubular member being welded and with sufficient pressure to force these edge portions downwardly toward the axis of the tubular member and to an extent such that the edges will come into engagement substantially at the weld point *w*, as best shown in FIG. 2. That is, the edge portions will be forced downwardly in spaced relation, as indicated at 36 and 37, with respect to the upper interior surfaces of the cavity 14, while the wall surfaces within the cavity serve to hold the remaining portions of the tubular member firmly in position whereby the gap edges at the weld point may be brought together under sufficient pressure to form a good forged weld. It will be understood that the high frequency current flows from the contacts 31, 32 respectively along the gap edges to and from the weld point for heating the very edge surfaces thereof rapidly up to welding temperature upon their coming together preferably at the maximum and desired welding temperature at the weld point.

With this type of arrangement, it will be apparent that substantially the same equipment may be used for welding tubing of a variety of cross-sectional shapes and dimensions, it merely being necessary to provide die means with an internal cavity suitably shaped to accommodate the particular shape and size of workpiece to be welded, whether straight-sided, tapered or otherwise shaped.

In case a tubular workpiece is to have two welded seams, it will be understood that after the first seam has been welded, the die means may be opened and the workpiece then turned about its axis to bring its other gap or seam-line into position for welding by using the die means over again in the same manner as above described.

Reference will now be had to FIGS. 5–9 inclusive which show adaptations of the apparatus such as will permit starting of the welding of the seam from the very forward end of the tubular member and for continuing the welding to the trailing end thereof. With the embodiment of the invention as shown in longitudinal vertical section in FIG. 5, the tubular member to be welded is indicated at 15', having a longitudinal gap as at 17', this member being adapted to be carried in die emeans as at 12' slidable along a horizontal line such as indicated at 40. As indicated in these FIGS. 5–9, small rollers 34', 35' are provided for the same purpose as the rollers 34, 35 above described, and the die means is adapted to be slidably advanced and held in position by means not shown in these figures, but like the means shown in FIGS. 1–3, for example.

The longitudinally-extending opening to the cavity 14' in the die means of FIGS. 5–9 has side edges as at 18', 19' and these, at the forward end of the die means, are interconnected or short-circuited as by a connection piece 41 which may be suitably and detachably secured in place as by screws 42, or otherwise. With this embodiment, contacts as at 31', 32' are provided, to function like the contacts 31, 32 in FIG. 1, but, as indicated in FIG. 6, at a time prior to the arrival at the weld point of the forward end of the tubular member to be welded, a circuit path will be provided as indicated by dotted lines and extending, for example, from contact 31' along one edge of the gap 17', thence along on the die means across on the short-circuiting member 41 to the other side of the die means, thence to the forward end of the other edge of the gap 17' and to contact 32'. Since the current is of high frequency, it will tend to flow along and be concentrated closely on the edges of the gaps which are closest to the opposite edges of the same gaps. Thus, as the gap edges of the forward end of the tubular member come into contact with contacts 31', 32', current will immediately start to flow along the path above described for starting to heat such edges as they advance and until they come together at the weld point, whereupon they will have reached the requisite temperature for welding when brought together under pressure by the rollers 34', 35'. At that moment, the current path from the contacts to and from the weld point as will be indicated by the dotted lines in FIG. 7, and the current will continue to follow a like path as the tubular member continues to advance and until the trailing end of the workpiece begins to approach the weld point.

The edge portions 18', 19', at the die opening, if desired, may be formed of high conductivity metal such as copper, and whereby the current in flowing thereover will meet with a relatively small amount of resistance and consequently same will become heated to a relatively slight degree as compared, for example, with the gap edges on the tubular member which are to be welded, and which in most cases will be formed of magnetic material and thus much more effectively heated by the high frequency current flowing thereon. It will be understood that the high conductivity edges such as at 18', 19' may be used, if desired, at the corresponding places in all of the embodiments of the invention.

With the embodiment of the invention shown in FIG. 9, the various parts, only some of which are here shown, may be like the corresponding parts of FIG. 1, except that here the trailing end edges of the gap 17 in the tubular workpiece are followed by a short tubular member 50 of high conductivity metal such as copper and lodged firmly in place within the die means and having a gap as at 51 forming a continuation of the gap 17. Thus, as the trailing end edges of the gap 17 pass contacts 31, 32, the edges of the gap 51 will continue to provide a current path for completing the circuit between the contacts until the trailing end edges of the gap 17 are brought into contact at the weld point, thus permitting welding up to the very end of the desired seam. Since the member 50 is formed of high conductivity metal as compared with the usual magnetic material of the workpiece, the edges of the gap 51 will ordinarily not become heated to welding temperature and become welded together even if they are squeezed together by the rollers 34, 35, after arrival beneath the latter. If desired, a tubular member such as that at 50 may be provided at the forward end of the workpiece for providing a current path for heating the forward end edges of the gap in the workpiece after they pass the contacts 31, 32 and until they reach the weld point.

In accordance with the alternative embodiment of the invention as shown in FIG. 10, a series of relatively short tubular members as at 60 may be slidably advanced by any suitable mechanical means (not shown) through suitable die means as at 61, 62, mounted in this case preferably in a stationary position, although, if preferred, as with the above-described embodiments, the die means, together with the series of workpieces therein, may be slidably advanced together by suitable advancing and guiding means such as hereinabove described.

A seam guide as at 63 is suitably mounted to engage within gaps in the workpieces and to insure that same will be in alignment. Rollers as at 64, 65 are suitably mounted and provided for a purpose like that of the rollers 34 and 35 above described, although in this case same may be located at portions shortly beyond the weld point. In this case, contacts as at 66 and 67 are provided at successive positions along the desired seam line and these are connected to a suitable source of high frequency current 68, which may be the same as hereinabove referred to, the connections being such as to provide a path from the source, through a connection 69 to the control 66, which preferably straddles the gaps in the workpieces. The current as parallel flows thereof thence passes along the edges of the gap to the contact 67, which is located at the region of the weld point or may straddle the same. Thence the current continues on a conductor 70 which extends along closely above the line of the desired seam in the workpieces and extends to a connection running back to the current source 68. Incidentally, as indicated at 69 and 70, the connections may in the form of fluid-cooled tubing, and the contacts 66, 67 should also, as per usual practice, have fluid-cooling cavities therein, as is the case with the contacts referred to in connection with all of the previous embodiments of the invention.

With the contacts and connections as shown at 66 to 70, the connection portion 70 extending along in close proximity to the desired seam line, will cause the current on the gap edges to be closely concentrated along beneath the conductor 70 even though parallel flows of current are provided with this arrangement along the opposite sides of the gap edges to be welded. This will result generally in heating the upper portions of the gap edges more than the internal portions and so that as the gap edges are brought together by the action of the rollers 64, 65, the metal will be upset largely in an upward direction, that is, outwardly of the tubular members. As indicated at 71, a scarfing tool may be provided, suitably mounted to cut away the upset metal along the seam line.

The arrangement of FIG. 10 provides a convenient means for rapidly welding a series of relatively short or more or less ring-like tubular members having gaps therein, for example members for forming automobile wheel rims or the like. Since the succession of members ordinarily will be in end-to-end contact, a substantially continuous seam will be formed along the succession. However, if, due to irregularities in the shaping of the ends of the successive members, they should not come into direct contact at the seam line, this will be unimportant because paths for the flow of current across any intervening slight gaps will be provided by the adges of the longitudinal opening to the cavity within the die means.

While in the drawings the apparatus is shown in a position with the tube gap extending along the top and with the die means embracing the sides of the tubing, it will be understood that the apparatus may be oriented as a whole into various other positions, if desired, and thus the terms "sides" and "downward" are used in the appended claims merely for convenience and only in a relative sense for referring to the apparatus in the particular positions shown in the drawings.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Method for welding longitudinal gaps in workpieces such as tubular members, which comprises: embracing the sides of same in die means while advancing same past a weld point; supplying high frequency heating current to flow along on the gap edges in advance of said point for heating the edges to welding temperatures upon reaching said point; and applying pressure to the gap edge portions respectively at the region of the weld point for there closing the gaps by pressing such portions downwardly in the die means in toward the longitudinal axis of the workpiece and into firm engagement with each other.

2. Method for welding longitudinal gaps in workpieces such as tubular members, which comprises: embracing the sides of same in die means while advancing same together with the die means past a weld point; supplying high frequency heating current to flow along on the gap edges in advance of said point for heating the edges to welding temperature upon reaching said point; and applying pressure to the gap edge portions respectively at the region of the weld point for pressing such portions downwardly in the die means and into welded engagement with each other.

3. Method for welding longitudinal gaps in workpieces such as a succession of tubular members, which comprises: advancing same while each presses against the next, through a cavity in die means and past a weld point, with the gaps in alignment and with the die means engaging the sides of the members; applying high frequency heating current to flow along on the gap edges in advance of said point for heating the edges to welding temperatures upon reaching said point; and applying downward pressure to the gap edge portions respectively at the region of the weld point for pressing such portions down toward the longitudinal axis of the succession of workpieces and into welded engagement with each other.

4. Method for welding a longitudinal gap in a tubular metal member which comprises: embracing the sides of same in an elongated box-like die means having a cavity of a shape generally corresponding to the member and with a longitudinally-extending opening to said cavity, the member being placed in said cavity in a position whereby the gap in the member extends along intermediate the sides of said opening; advancing such die means with the member therein longitudinally past a weld point; applying high frequency current to the gap edges for heating same to welding temperature upon reaching said point; and crowding the edge portions at said gap downwardly in the die means at the region of said weld point to bring such portions into welded engagement with each other.

5. Method in accordance with the foregoing claim 4 and in which the current is applied by contacts engaging respectively opposite sides of said gap in advance of the weld point, whereby said current flows from said contacts to and from the weld point, said die means, including said opening, extending forwardly beyond the forward end of the gap in the tubular member, and the sides of said opening being conductive and being interconnected at a point in advance of the forward end of the tubular member, whereby prior to the arrival of the forward end of the gap at said weld point, a current path is provided from said contacts partially along the gap edges and thence along the sides of said opening, whereby heating of the gap edges is initiated prior to arrival at the weld point.

6. Method for welding a longitudinal gap in a tubular metal member which comprises; embracing same in an elongated box-like die means having a cavity of a shape generally corresponding to the member and with a longitudinally-extending opening to said cavity, the member being placed in said cavity in a position whereby the gap in the member extends along intermediate the sides of said opening; advancing such die means with the member therein longitudinally past a weld point; applying high frequency current to the gap edges for heating same to welding temperature upon reaching said point; crowding the edge portions at said gap inwardly of the die means at the region of said weld point to bring such portions into welded engagement with each other; and providing conductive means in said opening following the trailing ends of said gap edges to continue to conduct said current to said edges shortly prior to the arrival of the trailing ends of the edges at the weld point.

7. Apparatus for welding a longitudinal gap in a tubular metal member which comprises: an elongated die-like means having a cavity shaped to receive and substantially embrace the tubular member, said cavity having an elongated longitudinally-extending opening intermediate the sides of which the gap in the tubular member is adapted to extend when within the cavity; means for advancing the die means with the tubular member therein past a weld point; means for applying high frequency current to the edges of said gap in advance of said point; and a pair of rollers respectively for engaging portions of the tubular member at opposite sides of said gap and urging same inwardly of the die means at the region of the weld point and into welded engagement with each other.

8. Apparatus for welding longitudinal gaps in tubular metal members which comprises: an elongated die-like means having a cavity shaped to receive and substantially embrace the tubular members, said cavity having an elongated longitudinally-extending opening intermediate the sides of which the gaps in the tubular members are adapted to extend when within the cavity; means for advancing the tubular members while in the die means past a weld point; means for applying high frequency current to the edges of said gap in advance of said point; and a pair of rollers respectively for engaging portions of the tubular members at opposite sides of the gaps and urging same inwardly of the die means at the region of the weld point and into welded engagement with each other.

9. Apparatus for welding a longitudinal gap in a tapered tubular member which comprises: an elongated die-like means having a cavity shaped to correspond to the tapered tubular member, said cavity having an elongated longitudinally-extending opening intermediate the sides of which the gap in the tubular member is adapted to extend when within the cavity; means for advancing the die means with the tubular member therein past a weld point; means for applying high frequency current to the edges of said gap in advance of said point; and a pair of rollers respectively for engaging portions of the tubular member at opposite sides of said gap and urging same inwardly of the die means at the region of the weld point and into welded engagement with each other.

10. Apparatus for welding a longitudinal gap in a tubular member which comprises: an elongated die-like means having a cavity shaped to receive and substantially embrace the tubular member, said cavity having an elongated longitudinally-extending opening intermediate the sides of which the gap in the tubular member is adapted to extend when within the cavity, the sides of said opening being of conductive material and adapted to extend forwardly beyond the forward end of the tubular member; means for advancing the die means with the tubular member therein past a weld point; contact means for applying high frequency current to the edges of said gap in advance of said point; and a pair of rollers respectively for engaging portions of the tubular member at opposite sides of said gap and urging same inwardly of the die means at the region of the weld point and into welded engagement with each other, the forward ends of the sides of said opening being interconnected, whereby same provide paths for said current shortly prior to arrival at the weld point of the forward end edges of the gap.

References Cited by the Examiner

UNITED STATES PATENTS

| Re. 25,183 | 6/62 | Rudd | 219—67 |
| 1,247,501 | 3/17 | Butcher | 219—59 |
| 2,794,108 | 5/57 | Park | 219—67 |
| 3,127,500 | 3/64 | Morris | 219—59 |

FOREIGN PATENTS 923,315   2/55   Germany.

RICHARD M. WOOD, *Primary Examiner.*

UNITED STATES PATENT OFFICE
CERTIFICATE OF CORRECTION

Patent No. 3,209,117 September 28, 1965

Jack Morris et al.

It is hereby certified that error appears in the above numbered patent requiring correction and that the said Letters Patent should read as corrected below.

Column 6, line 29, for "temperatures" read -- temperature --; line 32, for "gaps" read -- gap --; line 33, strike out "in", second occurrence; same column 6, line 53, for "temperatures" read -- temperature --; column 7, line 13, for "comprises;" read -- comprises: --.

Signed and sealed this 2nd day of August 1966.

(SEAL)
Attest:

ERNEST W. SWIDER
Attesting Officer

EDWARD J. BRENNER
Commissioner of Patents